United States Patent [19]

Suga

[11] 4,431,095
[45] Feb. 14, 1984

[54] LOCK-UP TYPE AUTOMATIC TRANSMISSION

[75] Inventor: Masaaki Suga, Yokohama, Japan

[73] Assignee: Nissan Motor Co., Ltd., Yokohama, Japan

[21] Appl. No.: 242,181

[22] Filed: Mar. 10, 1981

[30] Foreign Application Priority Data

Mar. 12, 1980 [JP] Japan ................... 55-30226

[51] Int. Cl.³ .................. F16D 47/06; B60K 41/22
[52] U.S. Cl. .................. 192/3.31; 192/3.29; 192/3.58
[58] Field of Search .......... 192/3.31, 3.29, 3.28, 192/3.58, 103 F; 74/733, 869

[56] References Cited

U.S. PATENT DOCUMENTS

| | | | |
|---|---|---|---|
| 2,856,794 | 10/1958 | Simpson | 74/763 |
| 3,073,179 | 1/1963 | Christenson | 74/733 X |
| 3,693,478 | 9/1972 | Malloy | 74/731 |
| 3,710,652 | 1/1973 | Miyazaki | 74/869 X |
| 3,752,282 | 8/1973 | Espenshied | 192/3.58 X |
| 3,857,302 | 12/1974 | Morris | 74/733 |
| 3,985,046 | 10/1976 | Morris et al. | 74/733 |
| 4,095,486 | 6/1978 | Ohnuma | 192/3.29 X |

FOREIGN PATENT DOCUMENTS

| | | |
|---|---|---|
| 55-69353 | 5/1980 | Japan . |
| 55-103149 | 8/1980 | Japan . |
| 55-109853 | 8/1980 | Japan . |
| 55-109854 | 8/1980 | Japan . |
| 2017840 | 10/1979 | United Kingdom ........... 192/3.31 |

*Primary Examiner*—Rodney H. Bonck
*Attorney, Agent, or Firm*—Schwartz, Jeffery, Schwaab, Mack, Blumenthal & Koch

[57] ABSTRACT

A lock-up type automatic transmission having a lock-up clutch between the pump impeller and the turbine runner of the torque converter. Control means for engaging and disengaging the lock-up clutch includes a lock-up control valve, a solenoid valve to control the shifting of the lock-up control valve, lock-up decision circuit means for producing a lock-up permission signal, shifting operation detector circuit means for producing a shift pulse signal, and a solenoid valve control means for controlling the solenoid valve to effect engagement of the lock-up clutch under conditions when the lock-up permission signal is present and the shift signal is not present, but to effect temporal disengagement of the lock-up clutch in response to the presence of the shift signal even when the lock-up permission signal is present. A delay means is provided to retard the appearance of the shift signal from the appearance of a demand for the shifting from one gear ratio to another gear ratio.

4 Claims, 10 Drawing Figures

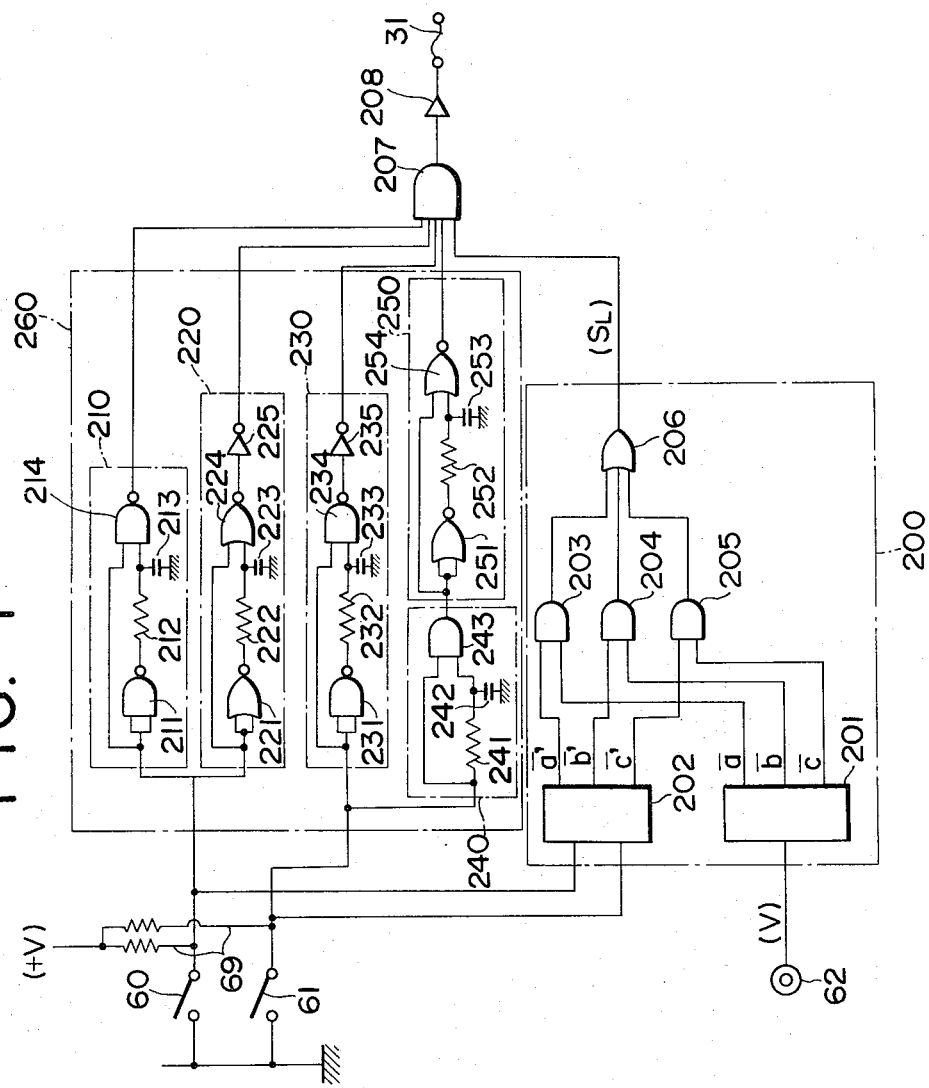

LOCK-UP TYPE AUTOMATIC TRANSMISSION

BACKGROUND OF THE INVENTION

1. Field of the Invention

The present invention relates to a lock-up type automatic transmission, viz., an automatic transmission having a lock-up clutch and a control.

2. Description of the Prior Art

Automatic transmissions provided with a torque converter are known. The torque converter has a pump impeller driven by an engine to rotate operating oil within the torque converter wherein the rotation of the operating oil causes a turbine runner to rotate under the reaction of a stator thereby to multiply the torque (torque converter state). During the operation of the torque converter there is a slip between the pump impeller and the turbine runner and therefore the automatic transmission provided with such torque converter has an advantage of easy operation, but has a drawback of poor power transmission effeciency, leading to poor fuel economy.

To alleviate this drawback, there has been proposed a so-called a torque converter with a lock-up clutch wherein during a relatively high vehicle speed operation range when torque variation of the engine does not create a problem, the turbine runner is directly connected to the pump impeller (lock-up state) thereby to eliminate the slip therebetween, and a lock-up type automatic transmission provided with a torque converter of this kind is already employed in some vehicles.

If a lock-up clutch of a torque converter is engaged when a vehicle speed is above a predetermined value in each of gear ratios, the lock-up operating ranges for all of the gear ratios, respectively, may be illustrated as shown in FIG. 7. This figure shows a shift pattern diagram for an up-shift operation of a three forward speed automatic transmission, wherein $V_1$, $V_2$ and $V_3$ denote predetermined lock-up vehicle speed values for a first gear ratio, a second gear ratio, and a third gear ratio, respectively, and A, B and C denote lock-up ranges for the first gear ratio, the second gear ratio, the third gear ratio, respectively. In the case of the automatic transmission wherein the lock-up clutch is engaged whenever the vehicle speed exceeds a predetermined vehicle speed value in each of the gear ratios, when the vehicle undergoes an automatic gear shifting operation with the accelerator pedal depressed to a great degree (a great opening degree of the throttle), the torque converter remains in the lock-up state during gear shifting operation because the lock-up ranges A to C adjoin one after another. However, if the gear shifting is effected with the torque converter remaining in the lock-up state, the torque variation is not absorbed by the torque converter, thus allowing a great shock to take place upon gear shifting.

Accordingly, it is designed to release the lock-up state during gear shifting operation even when the vehicle is operations in one of said lock-up ranges so as to allow the torque converter to operate in the torque converter state. For this purpose, there is provided a shifting operation detector circuit which produces a shift signal having a predetermined time duration in response to and after the appearance of a command for the shifting between two gear ratios to temporarily release the lock-up state during the actual gear shifting operation.

However, during the shifting operation from the second gear ratio to the third gear ratio, since the shift signal having the predetermined time duration $T_1$ is produced simultaneously with the instant $t_1$ when the demand is made to release the lock-up state, the lock-up state is released too early. This causes inconveniences as follows. There is a time lag from the instant when the shifting demand is made to the instant when the actual shifting operation initiates, viz., the initiation of actuation of the friction elements, because of the existence of a response delay in the hydraulic control system of the transmission. Therefore, if the lock-up state is released simultaneously with the shifting demand, since the lock-up state is released before the actual shifting operation initiates, the speed of the engine increases rapidly during the moment ranging from $t_1$ to $t_2$ as shown in FIG. 6(A), causing the engine to race. Owing to the fact that the release of the lock-up state terminates at an instance during the moment from $t_3$ to $t_4$ when the shifting operation is completed, the torque converter does not absorb the shift shock which occurs upon the gear shifting operation, and this fact, cooperating with the fact that the engine speed has been increased due to the engine racing mentioned above, increases the magnitude of a peak torque at the instant $t_5$ right after the shifting operation, with the inevitable result that a large shift shock occurs.

This tendency becomes marked during up-shifting operation in the automatic transmission because the shifting operation takes place with the power-on mode, and this problem is more serious upon up-shifting from the second gear ratio to the third gear ratio when a front clutch to be engaged for the third gear ratio is engaged while releasing a second brake to be engaged for the second gear ratio so that a relatively long overlap time is necessary.

As one measure to solve this problem, it is conceivable to increase the duration time $T_1$ up to the instant when the shifting operation will be completed, but this leaves the racing problem of the engine unsolved. This increase in the engine speed causes the corresponding increase in the magnitude of the shift shock.

SUMMARY OF THE INVENTION

According to the present invention, a lock-up type automatic transmission comprises a torque converter having a lock-up clutch between the turbine runner and the pump impeller and control means for engaging and disengaging the lock-up clutch. The control means has lock-up decision circuit means for producing a lock-up permission signal, shifting operation detector circuit means for producing a shift signal having a predetermined duration time in response to the appearance of a demand for the shifting between two gear ratios, and means for effecting engagement of the lock-up clutch under conditions when the lock-up permission signal is present and the shift signal is not present, but effecting the temporal disengagement of the lock-up clutch during the presence of the shift signal even when the lock-up permission signal is present. Delay means is provided for retarding the appearance of the shift signal by a predetermined amount of time which starts from the appearance of the gear shifting command.

BRIEF DESCRIPTION OF THE DRAWINGS

The invention will be more apparent from the following description and drawings in which:

FIG. 4 is a circuit diagram for the control of the solenoid valve shown in FIG. 3B;

DESCRIPTION OF THE PREFERRED EMBODIMENT

Figure 1:
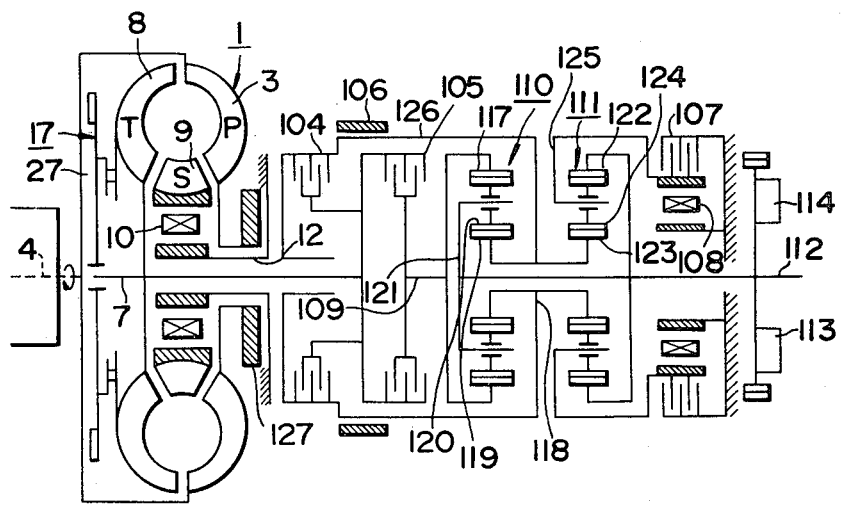
FIG. 1 is a schematic view of a planetary gearing portion of a lock-up type automatic transmission.

Referring to the drawings and particularly to FIG. 1, there are shown a crankshaft 4 driven by a prime mover, an engine, a torque converter 1 having a lock-up clutch 17 which will be described later, an input shaft 7, a front clutch 104 (a high-and-reverse clutch), a rear clutch 105 (a forward clutch), a second brake 106, a low reverse brake 107, a one-way brake 108, an intermediate shaft 109, a first planetary gear unit 110, a second planetary gear unit 111, an output shaft 112, a first governor valve 113, a second governor valve 114, and an oil pump 13. The torque converter 1 comprises a pump impeller 3, a turbine runner 8, and a stator 9, in which the pump impeller 3 is driven by the crank shaft 4 to circulate the torque converter operation oil therein so as to transmit torque to the turbine runner 8 fixed on the input shaft 7. The torque is further transmitted by the input shaft 7 to a change-speed planetary gearing. The stator 9 is disposed on a sleeve 12 through a one-way clutch 10, the one-way clutch allowing the stator 9 to rotate in the same direction as the crankshaft 4, that is, in the direction indicated by an arrow in FIG. 1 (this rotation is referred to as forward rotation hereinafter), but not allowing it to rotate in the reverse direction (this rotation is referred to as reverse rotation hereinafter). The first planetary gear unit 110 comprises an internally toothed gear 117 fixed on the intermediate shaft 109, a sun gear 119 fixed on a hollow transmitting shaft 118, and more than one planetary pinions 120 capable of performing rotation and revolution simultaneously while meshing with the internally toothed gear 117 and sun gear 119 respectively, and a planetary pinion carrier 121 for supporting the planetary pinions 120 fixed on an output shaft 112. The the second planetary gear unit 111 comprises an internally toothed gear 122 fixed on the output shaft 112, a sun gear 123 fixed on the hollow transmitting shaft 118, and more than one planetary pinions 124 capable of performing rotation and revolution while meshing with the internally toothed gear 122 and sun gear 123 respectively, and a planetary pinion carrier 125 for supporting the planetary pinions 124. The front clutch 104 is operative to connect the input shaft 7 to be driven by the turbine runner 8 to the hollow transmitting shaft 118 integrally rotatable with both of the sun gears 119 and 123 through a drum 126, whereas the rear clutch 105 is operative to connect the input shaft 7 to the internally toothed gear 117 of the first planetary gear unit 110 through the intermediate shaft 109. The second brake 106 is operative to anchor both sun gears 119 and 123 by braking the drum 126 fixed on the hollow transmitting shaft 118, whereas the low reverse brake 107 is operative to anchor the pinion carrier 125 of the second planetary gear unit 111. The one-way brake 108 allows forward rotation of the pinion carrier 125 but not reverse rotation thereof. The first and second governor valve assemblies 113 and 114 are operatively connected to the output shaft 112 and produce governor pressure in response to the vehicle speed.

Now, the power flow paths established when a manual speed selector rod is set in the D position (forward drive range) will be explained.

In this case, only the rear clutch 105, a forward clutch, is engaged. The power output of the engine via the torque converter 1 is transmitted by the input shaft 7 and rear clutch 105 to the internally toothed gear 117 of the first planetary gear unit 110. This rotation of the internally toothed gear 117 causes the planetary gears 120 to rotate forwardly. Accordingly, the sun gear 119 rotates reversely, and, since the sun gear 123 of the second planetary gear unit 111 which is rotatable with the sun gear 119 rotates reversely, the planetary gears 124 of the second planetary gear unit 111 rotate forwardly. The one-way brake 108 acts as a forward reaction brake to prevent the pinion carrier 125 from being rotated reversely by the sun gear 123, thus causing the forward rotation of the internally toothed gear 122 of the second planetary gear unit 111. Accordingly, the output shaft 112 which is rotatable with the internally toothed gear 122 rotates forwardly, thereby establishing the first forward gear ratio.

If, in this state, the vehicle speed increases enough to cause the application of the second brake 106, the power flow path through the input shaft 7 and rear clutch 105 up to the internally toothed gear 117 is the same as that for the first forward speed. The second brake 106 acts as a forward reaction brake to anchor the drum 126 for preventing the rotation of the sun gear 119. This causes the planetary pinions 120 to rotate, revolving simultaneously, around the anchored sun gear 119, and accordingly the planetary pinion carrier 121 and output shaft 112, which is rotatable with the pinion carrier 121, rotate at a faster speed than in the case of the first speed although with a certain reduction ratio, thereby establishing the second forward gear ratio.

If the vehicle speed further increases so as to cause the second brake 106 to be released and, in lieu thereof, the front clutch 104 to be engaged, the power on the input shaft 7 is transmitted partially through the rear clutch 105 to the internally toothed gear 117, while the remainder is transmitted through the front clutch 104 to the sun gear 119. Thus, the internally toothed gear 117 and sun gear 119 are interlocked and rotate forwardly, as a unit, together with both the pinion carrier 121 and output shaft 112 at the same rotational speed, thereby establishing the third forward gear ratio. In this case, the input is fed to both the front clutch 104 and rear clutch 105 and the torque increase is not carried out by the planetary gears so that none act as a reaction brake in this state.

The planetary gearing arrangement illustrated in and described in connection with FIG. 1 is similar in construction to the planetary gearing arrangement disclosed in U.S. Pat. No. 2,856,794 issued to H. W. Simpson, on Oct. 21, 1958, and reference thereto may be made for a more complete description of the construction and operation of the transmission.

Figure 2A:
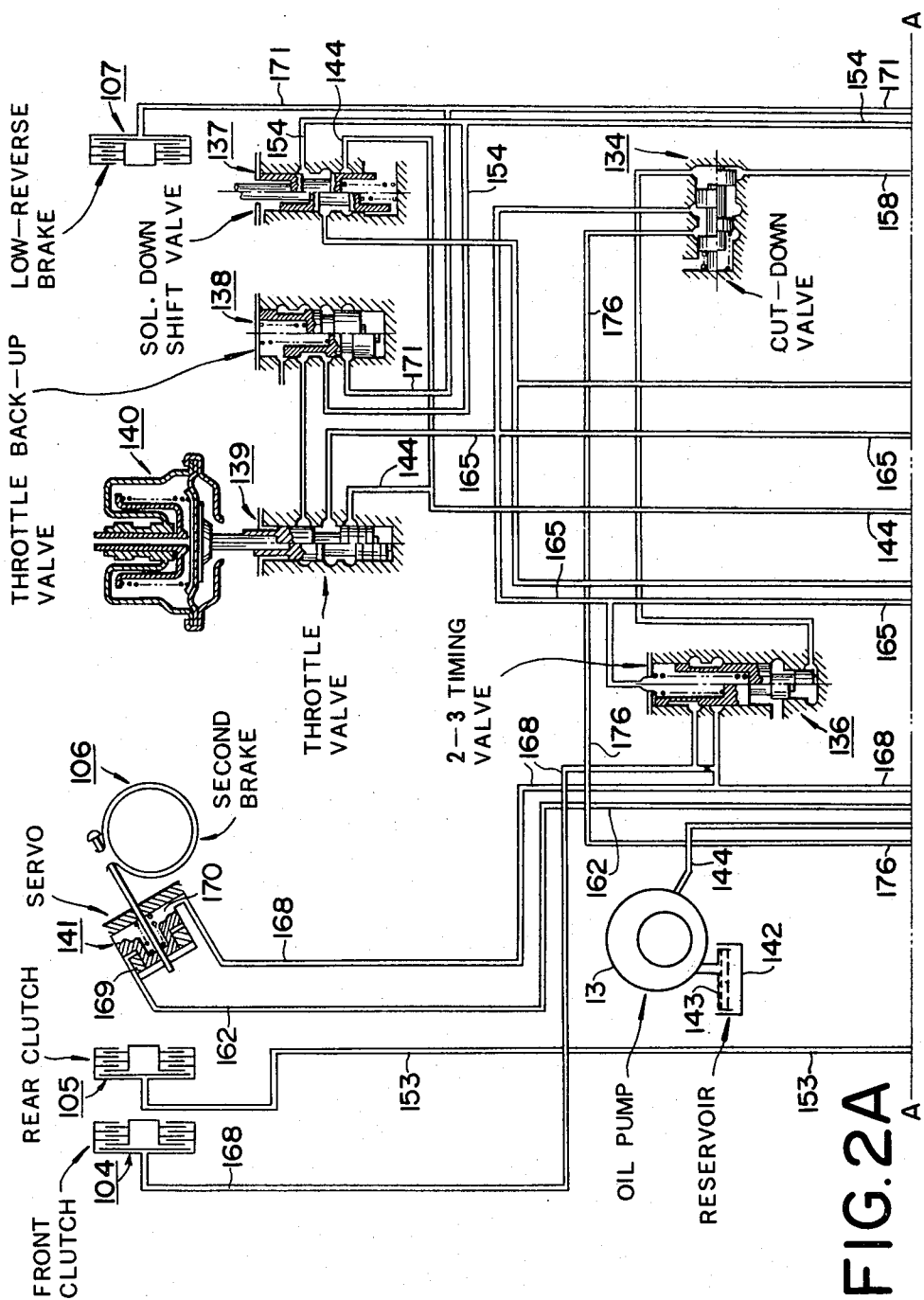
FIGS. 2A and 2B, when combined, provide a schematic view of a hydraulic control portion of the lock-up type automatic transmission.
Figure 2B:
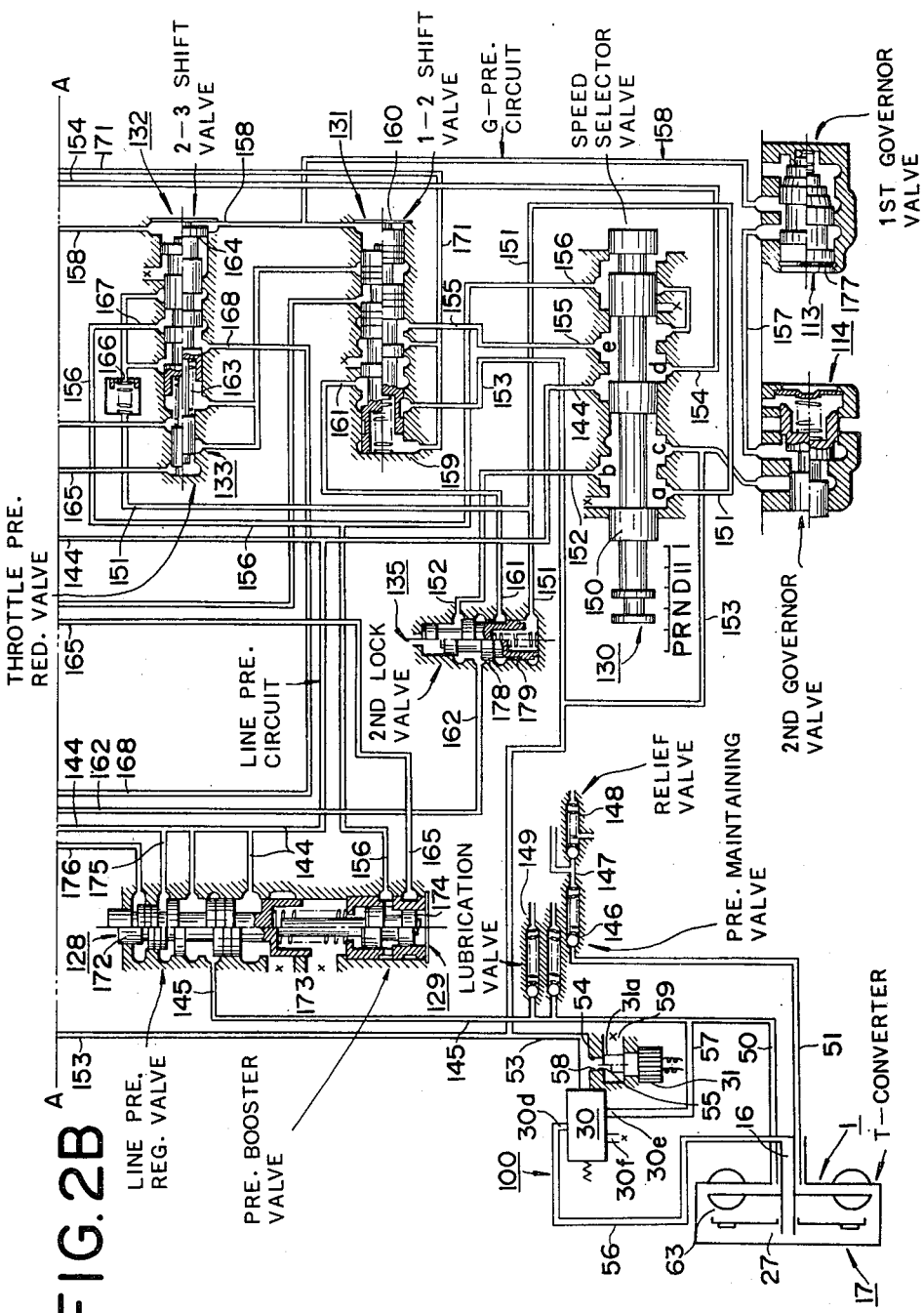

FIGS. 2A and 2B show a hydraulic control system of the above-described change speed transmission, which control system comprises an oil pump 13, a line pressure regulator valve 128, a pressure booster valve 129, a torque converter 1, a speed selector valve 130, a first governor valve 113, a second governor valve 114, a 1–2 shift valve 131, a 2–3 shift valve 132, a throttle pressure reducing valve 133, a cut-down valve 134, a second lock valve 135, a 2–3 timing valve 136, a solenoid down shift valve 137, a throttle back-up valve 138, a vacuum throttle valve 139, a vacuum diaphragm 140, a front clutch 104, a rear clutch 105, a second brake 106, a servo 141, a low-reverse brake 107, and oil pressure circuits. The oil pump 13 is driven by a prime mover through the driving shaft 14 and the pump impeller P of the torque converter 1 for drawing oil from a reservoir 142 through a strainer 143, where harmful dust is removed, during all operating conditions of the prime mover to send the oil to a line pressure circuit 144. The oil is regulated by the line pressure regulator valve 128 and the thus regulated oil is transmitted to the torque converter 1 and speed selector valve 130.

The hydraulic control system illustrated in FIGS. 2A and 2B is similar in construction to the hydraulic control system disclosed in U.S. Pat. No. 3,710,652, issued to T. Miyazaki, on Jan. 16, 1973, and reference may be made thereto for a more complete description of the construction and operation of the transmission.

The line pressure regulator valve 128 comprises a spool 172 and a spring 173, in which, in addition to the spring 173, the throttle pressure in a circuit 165 and the line pressure in a circuit 156 act on the spool 172 via a spool 174 of the pressure booster valve 129 against the line pressure from a circuit 144 through an orifice 175 and the pressure from a circuit 176 both acting on upper areas of the spool 172.

The torque converter operating oil pressure is introduced from the circuit 144 through the line pressure regulating valve 128 to a circuit 145 and, with a pressure maintaining valve 146, the level of this pressure is maintained within a certain range. When the pressure exceeds a certain level, the pressure maintaining valve 146 opens to permit the oil into a circuit 147 toward the rear lubricating part of the power transmitting mechanism. When the lubricating oil pressure is too high, a relief valve 148 opens, resulting in a pressure drop. On the other hand, the lubricating oil is supplied from the circuit 145 through a front lubrication valve 149, as it is open, to the front lubricating part of the power transmitting mechanism. The speed selector valve 130 is a manually operable liquid direction switching valve and it comprises a spool 150, and is connected to a speed selector rod (not shown) through a linkage so that manipulating the speed selector rod into any desired one of the positions causes the spool 150 to change the passage of the line pressure circuit 144. FIG. 2B shows a condition of the speed selector valve when the spool takes up the N (neutral) position, wherein the line pressure circuit 144 is permitted to communicate with two ports d and e.

The first and second governor valves 113 and 114 are in operative condition to produce a governor pressure while the automobile is moving forwardly. When the speed selector valve 130 assumes either the D, II or I position, the oil pressure is fed from the line pressure circuit 144 to the second governor valve 114 through the port c of the speed selector valve 130. If under this condition the automobile begins to move, the governor pressure regulated by the second governor valve 114 is supplied to a circuit 157 leading to the first governor valve 113, and subsequently when the vehicle speed reaches a predetermined value, the spool 177 of the first governor valve 113 moves to a position wherein the circuit 157 communicates with a circuit 158, supplying the latter with the governor pressure regulated by the second governor valve 114. The governor pressure is also supplied to the circuit 158, thus acting on the respective end surfaces of the 1–2 shift valve 131, 2–3 shift valve and cut-down valve 134 against the respective springs which urge these valves toward respective lower half positions illustrated in FIGS. 2A and 2B.

In the oil flow passageway leading from the port c of the speed selector valve 130 through a circuit 153, a circuit 161 and a circuit 162, up to an apply side oil pressure chamber 169, the 1–2 shift valve 131 and second lock valve 35 are separately arranged, and a circuit 152 leads from the port b of the speed selector valve 130 to the second lock-up valve 135.

If the speed selector lever 130 is moved to the D position, the spool 150 of the speed selector valve 130 is moved to a position providing communication between the line pressure circuit 144 and ports a, b and c. From the port a, the oil pressure is transmitted through the circuit 151 to the second lock valve 135 to act on the lower end thereof for preventing the interruption of the circuits 161 and 162 which are permitted to communicate with each other when the spool 178 is pushed down, which spool is urged upwardly by a spring 179 and urged downwardly by the oil pressure transmitted thereto through the circuit 152 from the port b, while, the oil pressure at the port a is transmitted through an orifice 166 and a circuit 167 to the 2–3 shift valve 132. The oil pressure at the port c is transmitted through a circuit 153 to the second governor valve 114, rear clutch 105, and 1–2 shift valve 131, thereby providing the first forward gear ratio condition of the transmission.

When, under this condition, the vehicle speed increases up to a certain level the governor pressure in the circuit 158 urges the spool 160 to the 1–2 shift valve 131, which is urged to the right by the spring 159, to move to the left, for effecting an upshift from the first forward speed to the second forward speed, and, as a result, the circuit 153 is permitted to communicate with the circuit 161 thereby allowing the oil pressure to be transmitted through the second lock valve 135 to the apply side oil pressure chamber 169 of the servo 141 through a circuit 162 to apply the second brake 106, thus establishing the second forward gear ratio condition.

Since the 1–2 shift valve 131 in this control system is minimized, the spool 160 is highly responsive to effect movement to the left with the necessary speed, so that the vehicle speed at which the upshift is made does not move toward the higher vehicle speed side from the designed speed level.

When the vehicle speed further increases up to another certain value, the governor pressure in the circuit 158 urges the spool 164 of the 2–3 shift valve 32 to the left overcoming the spring 163, so that the circuit 167 is permitted to communicate with the circuit 168 directing the oil pressure, through the circuit 168, to the release-side oil pressure chamber 170 of the servo 141 so as to release the second brake 106 and also to the front clutch 104 to engage the clutch 104, thus establishing the third forward gear ratio condition.

If the speed selector lever is moved to the II position, the spool 150 of the speed selector valve 130 is moved to a position providing communication between the line pressure circuit 144 and the ports b, c and d. The oil pressure at the port b is fed to the same place as in the case of D and the oil pressure at the port c is fed to the rear clutch to engage the latter. Because, under this condition, the oil pressure does not act on the lower end of the second lock valve 135 and because the lower land has a larger area than the upper land, which lands form a space on the spool 178 opening to the circuit 152, the spool 178 of the second lock valve 135 is pressed downwardly against the force of the spring 178 to assume a position in which the circuit 152 is permitted to communicate with the circuit 162, permitting the oil pressure to reach the apply side oil pressure chamber 169 of the servo 141 so as to effect application of the second brake 106, thereby establishing the second forward gear ratio condition. The oil pressure at the port d is transmitted through the circuit 154 to the solenoid down shift valve 137 and throttle back-up valve 138. Since the communication between the line pressure circuit 144 leading to the speed selector valve 130 and the port a thereof is prevented, the oil pressure does not get through the circuit 151 to the 2-3 shift valve 132, thus neither release of the second brake 106 nor the application of the front clutch 104 will take place, so that an upshift to the third forward speed is prevented. As explained, the second lock valve 135 cooperates with the speed selector valve 130 to lock the transmission in the second forward speed. If the speed selector lever is moved to the I position (the first forward speed fixed), the line pressure circuit 144 is permitted to communicate with the ports c, d and e. The oil pressure at the port c reaches the rear clutch 105 to effect clutch engagement and the oil pressure at the port d reaches the same places as in the case of II, whereas the oil pressure at the port e is transmitted through the circuit 155, 1-2 shift valve 131 and the circuit 171 to the low-reverse brake 107 so as to apply the low reverse brake 107 which, when applied, acts as a forward reaction brake, thereby placing the transmission in the first forward gear ratio condition. The oil pressure at the port e is applied to the left end of the 1-2 shift valve assembly 131, through the circuit 171, urging it to press the spool 160 to the right in cooperation with the spring 159, thereby locking the transmission in the first forward speed once a downshift is made thereto.

In FIG. 2B, the reference numeral 100 denotes a lock-up control system which comprises a lock-up control valve 30 and a solenoid valve 31.

Figure 3A:
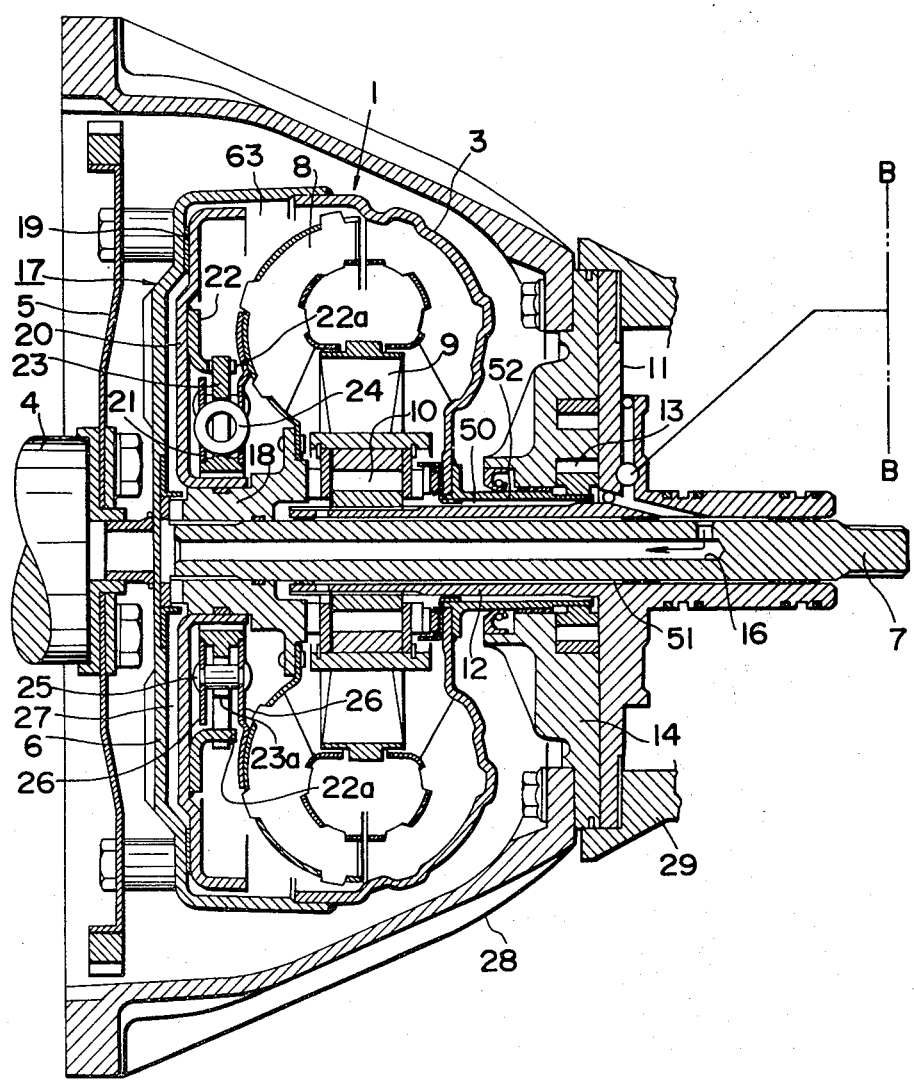
FIGS. 3A and 3B, when combined, provide a schematic sectional view showing the torque converter with a lock-up clutch, lock-up control valve and solenoid valve shown in FIG. 2B.
Figure 3B:
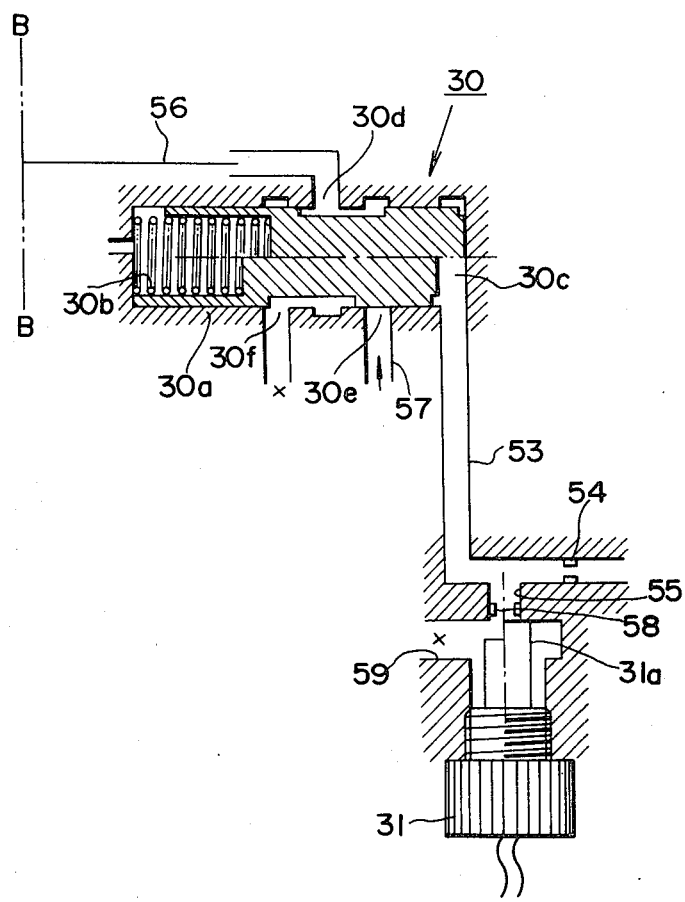

Referring to FIGS. 3A and 3B, the lock-up control valve 30, solenoid 31 and the torque converter 1 with a lock-up clutch 17 are specifically explained hereinafter.

The pump impeller 3 of the torque converter 1 is connected via a torque converter cover 6 with a drive plate 5 connected to the engine crankshaft 4. The turbine runner 8 is splined to the input shaft 7 with a hub 18, and further the stator 9 is connected to the sleeve 12 via the one-way clutch 10. The torque converter 1 is enclosed by a converter housing 28 which is connected together with a pump housing 14 and a pump cover 11 to a transmission case 29. The pump housing 14 and pump cover 11 cooperate to define a chamber within which the oil pump 13 is accommodated. The oil pump 13 which pump is connected to the pump impeller 3 through a hollow shaft 52 driven by the engine. The hollow shaft 52 jackets therein the sleeve 12 to define an annular oil feed passage 50, and the sleeve 12 allows the input shaft 7 to extend therethrough and cooperate to define therebetween an oil discharge passage 51. The sleeve 12 is formed integrally with the pump cover 11.

The lock-up clutch 17 has the following structure. A lock-up clutch piston 20 is fit around the hub 18 in an axially slidable manner, and this lock-up clutch piston is accommodated within the converter cover 6. The lock-up clutch piston 20 has an annular clutch facing 19 fixed to a surface thereof positioned opposite to the end wall of the torque converter cover 6, thereby providing an arrangement wherein when this clutch facing contacts with the end wall of the converter cover 6, a lock-up clutch chamber 27 and a torque converter chamber 63 are defined on the opposite sides of the lock-up clutch piston 20.

The lock-up clutch piston 20 is drivingly connected to the turbine runner 8 via a torsional damper 21. The torsional damper 21 is of the same type as that used in a dry-type clutch and the like and comprises a drive plate 23, torsional springs 24, rivets 25 and driven plates 26. An annular member 22 is welded to the lock-up clutch piston 20 and has its claws 22a drivingly engaging in cutouts 23a formed through the drive plate 23, and the driven plate 26 is attached to the turbine runner 8. The lock-up chamber 27 communicates with a lock-up passage 16 formed through the input shaft 7, which lock-up passage is operatively associated with said lock-up control system 100.

The lock-up control valve 30 is provided with a spool 30a which when taking an illustrated upper half position in FIG. 3B, permits a port 30d to communicate with a port 30e and, when taking an illustrated lower half position, permits the port 30d to communicate with a drain port 30f. The port 30d communicates through a passage 56 with the lock-up passage 16; the port 30e communicates through a branch passage 57 with a torque converter operating oil feed passage 50 as shown in FIG. 2B; and a chamber 30c communicates through a passage 53 with the rear clutch pressure passage 153 as shown in FIG. 2B.

An orifice 54 is provided in the passage 53 at an intermediate portion, and the passage 53 has a branch passage 55 from a location between this orifice and the chamber 30c. The branch passage 55 has therein an orifice 58 and communicates with a drain port 59 and is associated with the solenoid valve 31 adapted to open and close the branch passage 55. For this purpose, the solenoid valve 31 has a plunger 31a which normally takes as illustrated left half position in FIG. 2B or FIG. 3B, but when the solenoid 31 is energized, it projects to assume as illustrated right half position to close the branch passage 55.

When the solenoid valve 31 is not energized to allow the plunger 31a to open the branch passage 55, this branch passage communicates with a drain port 59. Then, the rear clutch pressure in the passage 53 and directed toward the chamber 30c is discharged through a drain port 59, thus allowing the lock-up control valve 30 to communicate the port 30d with the port 30e because the spool 30a is urged by a spring 30b to take the illustrated upper half position in FIG. 3B. Therefore, a torque converter interior pressure reaching the passage 57 is supplied through the ports 30e, 30d, passage 56, passage 16 to the lock-up chamber 27, thus causing the pressure within the lock-up chamber 27 to have the same pressure value as that within the converter chamber 63. This causes the lock-up clutch piston 20 to move rightwardly from the illustrated FIG. 3A position to disengage its clutch facing 19 from end wall of the converter cover 6; thus releasing the direct connection between the pump impeller 3 and the turbine runner 8, allowing the torque converter 1 to transmit the power in the torque converter state.

When the solenoid valve 31 is energized to cause the plunger 31a to close the branch passage 55, the rear clutch pressure is supplied through the passage 53 to the chamber 30c, allowing the lock-up control valve 30 to communicate the port 30d with the drain port 30f because the spool 30a is moved leftwardly from the illustrated upper half position to the illustrated lower half position in FIG. 3B. This causes the lock-up chamber 27 to communicate through the lock-up passage 16, passage 56, port 30d to a drain port 30f, causing the pressure therein to be zero. Then, the lock-up clutch piston 20 is moved leftwardly as viewed in FIG. 3A by means of the torque converter interior pressure into contact with the end wall of the torque converter cover 6, thus establishing a lock-up state wherein the pump impeller 3 is connected directly to the turbine runner 8.

On and off control of, viz., energization and deenergization control of, the above-mentioned solenoid valve 31 is effected by an electronic solenoid valve control circuit shown in FIG. 4. Referring to FIG. 4, 60 denotes a 1-2 shift switch, 61 denotes a 2 ∝ 3 shift switch, and 62 denotes a vehicle speed sensor. As clearly shown in FIG. 5, the 1-2 shift switch 60 and 2-3 shift switch 61 are mounted within the 1-2 shift valve 131 and 2-3 shift valve 132, respectively, in such a manner that they open or close in response to the movements of the corresponding valve spools 160 and 164. Stationary contacts 65 and 66 are mounted at positions opposite to the valve spools 160 and 164, respectively, and these stationary contacts are electrically insulated from the side plate 64 with insulators 67 and 68 and cooperate with the valve spools 160 and 164 which act as movable contacts. Since the shift valves 131 and 132 are grounded to the vehicle body, it is only necessary to connect respective leads 69 from the stationary contacts 65 and 66 to a source of electricity +V thus enabling the stationary contact 65 and the valve spool 160 to form the 1-2 shift switch 60 and enabling the stationary contact 66 and the valve spool 164 to form the 2-3 shift switch 61.

Figure 5:
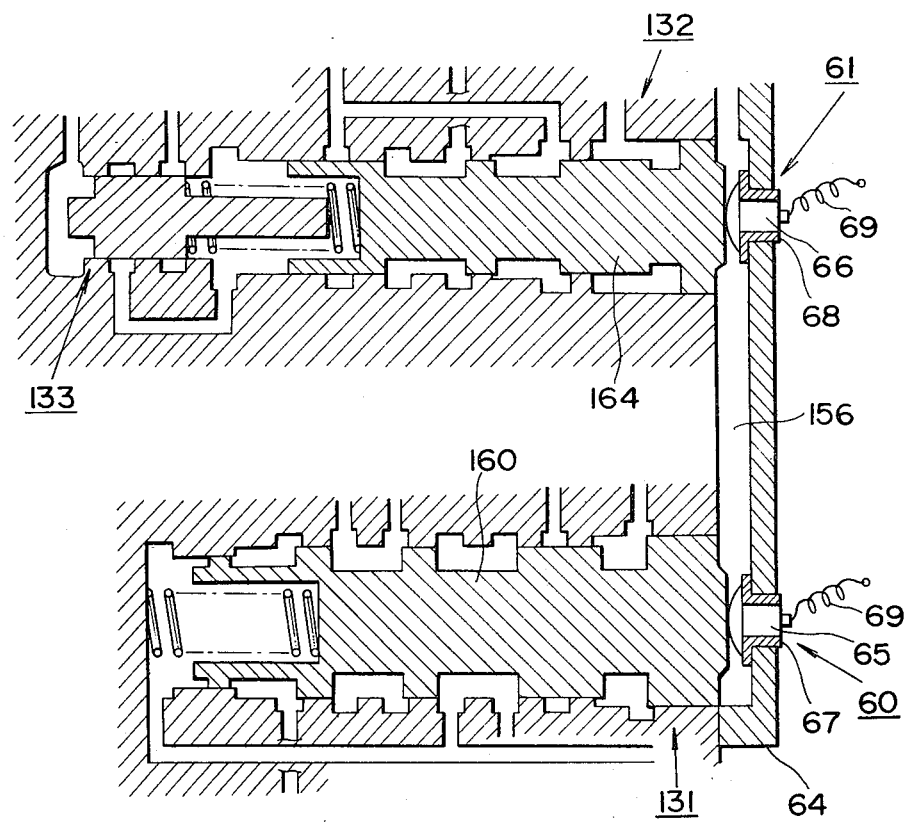
FIG. 5 is a sectional view of the 1–2 shift valve and 2–3 shift valve of the control shown in FIG. 2B showing the structures of shift switches shown in FIG. 4.
Figure 6A:
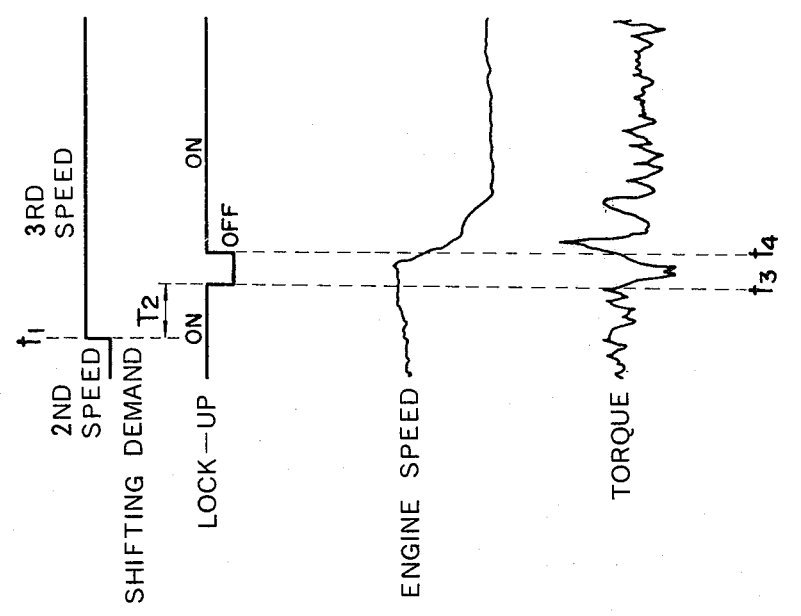
FIG. 6A is a timing diagram for explaining the conventional control of the lock-up type automatic transmission in the introductory part of this specification.
Figure 6B:
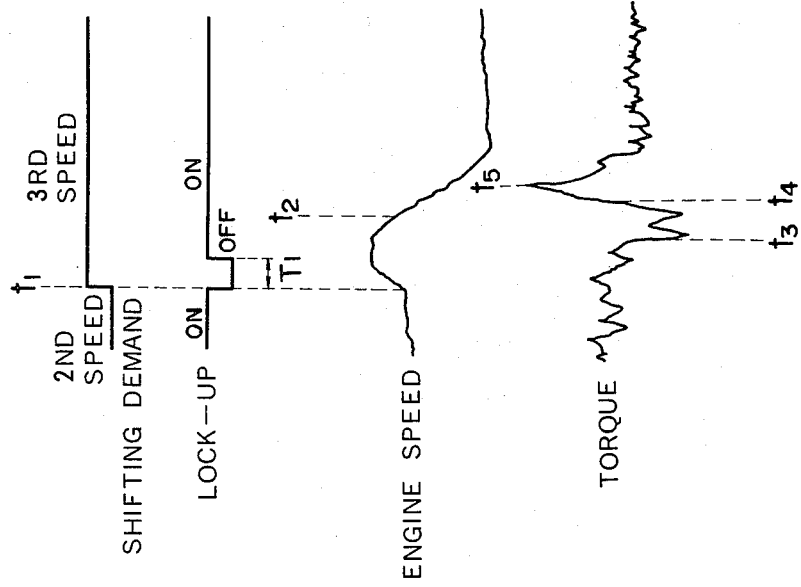
FIG. 6B is a similar timing diagram as FIG. 6A and is used to explain the operation of the embodiment of the present invention.

As will now be understood from the preceding, when the transmission is in the first gear ratio, both of the valve spools 160 and 162 are in contact with the stationary contacts 65 and 66 as shown in FIG. 5, thus causing the 1-2 shift switch 60 and the 2-3 shift switch 61 to produce low level signals (L). When the transmission is in the second gear ratio, the valve spool 160 only is in a position moved leftwardly to disengage from the stationary contact 65, thus causing the 1-2 shift switch 60 to produce a high level signal (H). When the transmission is in the third gear ratio, the valve spool 164 is also in a position moved leftwardly to disengage from the stationary contact 66, thus causing the 2-3 shift switch 61 to produce the H level signal.

The control circuit shown in FIG. 4 includes a lock-up decision circuit 200 which receives the output of the 1-2 shift switch 60 and the output of the 2-3 shift switch 61 and a shifting operation detector circuit 260. A vehicle speed signal V proportional to the vehicle speed provided by the vehicle speed sensor 62 is fed to the lock-up decision circuit 200.

The lock-up decision circuit 200 comprises a vehicle speed comparator circuit 201, a gear ratio detector circuit 202, AND gates 203 to 205, and an OR gate 206. The vehicle speed comparator circuit 201 compares the vehicle speed signal V fed thereto with a lock-up vehicle speed value $V_1$ for the first gear ratio, a lock-up vehicle speed value $V_2$ for the second gear ratio and a lock-up vehicle speed value $V_3$ for the third gear ratio (see FIG. 7) to provide a H level signal at the corresponding one of the gates $\bar{a}$, $\bar{b}$, and $\bar{c}$ when the vehicle speed signal is higher than the respective lock-up vehicle speed value, which H level signal is fed to one input terminal of AND gates 203 to 205.

Figure 7:
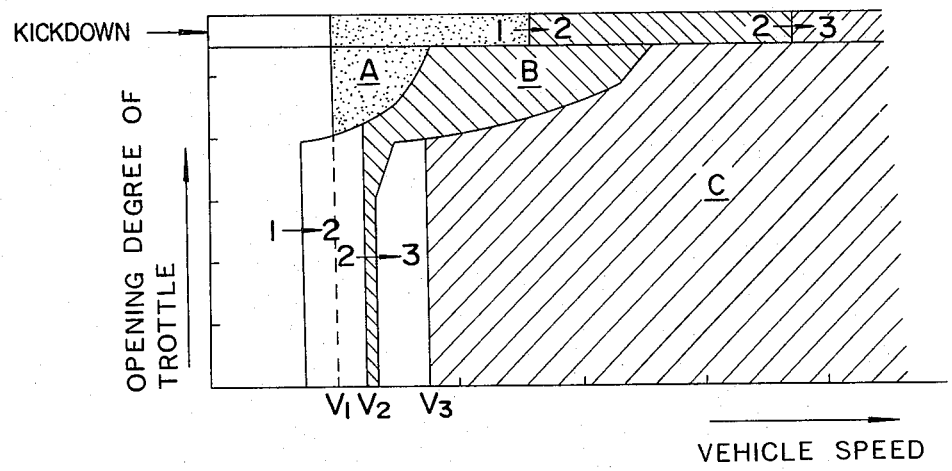
FIG. 7 is a shift pattern diagram.

The gear ratio detector circuit 202 determines the gear ratio selected in the transmission in response to the combination of open or close of the 1-2 shift switch 60 and that of the 2-3 shift switch 61, viz., a combination of signal levels of the outputs of these shift switches, and provides a H level signal at a gate $\bar{a}'$ only during the first gear ratio operation, a H level signal at a gate $\bar{b}'$ only during the second gear ratio operation and a H level signal at a gate $\bar{c}'$ only during the third gear ratio operation to feed same to the other input terminals of the corresponding AND gates 203 to 205. Therefore, the AND gate 203 produces a H level signal during operation within a lock-up range A as shown in FIG. 7; the AND gate 204 produces a H level signal during operation within a lock-up range B as shown in FIG. 7; and the AND gate 205 produces a H level signal during operation within a lock-up range C as shown in FIG. 7. An OR gate 206 receives the outputs of the AND gates 203 to 205 and produces a lock-up permission signal $S_L$ having a H level when the vehicle is within any one of the lock-up ranges A to C as shown in FIG. 7.

The gear ratio detector circuit 260 comprises a trigger pulse generating circuit 210 to detect a rise in level of the output signal of the 1-2 shift switch 60, a trigger pulse generating circuit 220 to detect a drop in level of the output signal of the 1-2 shift switch 60, a tigger pulse generating circuit to detect a drop in level of the ouput signal of the 2-3 shift switch 61, a delay circuit 240 and a trigger pulse generating circuit 250 to detect a rise in level of the output signal of the 2-3 shift switch 61.

The trigger pulse generating circuit 210 comprises in the usual manner a NAND gate 211, a resistor 212, a condensor 213 and a NAND gate 214. the trigger pulse generating circuit 220 comprises in the usual manner a NOR gate 221, a resistor 222, a condensor 223, a NOR gate 224 and an inverter 225, and the trigger pulse generating circuits 230 and 250 comprise the same elements 231 to 235 and 251 to 254 as those of the above trigger pulse generating circuits 210 and 220. The delay circuit 240 comprises a RC circuit including a resistor 240, a resistor 241 and a condenser 242, and an AND gate 243.

When the 1-2 shift switch 60 and the 2-3 shift switch 61 remains in an on or off state during usual operation outside of the shifting operation, the trigger pulse generating circuits 210, 220, 230, 250 continue to feed H level signals to the AND gate 207 irrespective of the height in level of the output signals so that the AND gate 207 produces the H level signal or L level signal in response to the presence or absence of the lock-up permission signal (H level signal). When the AND gate 207 produces the H level signal, this signal is amplified by an amplifier 208 and then energizes the solenoid valve 31 to effect lock-up of the torque converter 1. When the AND gate 207 produces the L level signal, the solenoid valve 31 is in the deenergized state, thus rendering the torque converter in the torque converter state as described before. Therefore, the torque converter 1 is rendered in the lock-up state during the operation within one of the ranges A, B and C as shown in FIG. 7, but rendered in the torque converter state during operation outside of these ranges.

During up-shifting operation from the first gear ratio to the second gear ratio or from the second gear ratio to the third gear ratio or during down-shifting operation from the third gear ratio to the second gear ratio or from the second gear ratio to the first gear ratio, the output of the corresponding shift switch 60 or 61 is shifted between on (H level signal) and off (L level signal) and the trigger pulse generating circuit 210 or 220 or 230 or 250 produces a negative polarity pulse signal.

During the shifting operation from the first gear ratio to the second gear ratio, the 1–2 shift switch 60 is shifted from the on state to the off state so that its output signal changes from the L level to the H level. This rise in the output signal causes the trigger pulse generating cicruit 210 to produce a L level signal simultaneously with the rise in the output signal (the appearance of demand for shifting) and continue to produce it for a duration of time corresponding to the time constant determined by the resistor 212 and the condensor 213. In other words, the trigger pulse generating circuit 210 produces one-shot negative polarity pulse signal (shift signal) upon the appearance of the demand for shifting, viz., upon the opening of the 1–2 shift switch 60.

During shifting operation from the second gear ratio to the first gear ratio, the 1–2 shift switch 60 is shifted from on state to off state so that the output signal changes from H level to L level, and this drop in level of the output signal causes the trigger pulse generating circuit 220 to produce an L level signal for a time duration corresponding to the time constant determined by the resistor 222 and the condensor 223. In other words, the trigger pulse generating circuit 220 produces a one-shot negative polarity pulse signal (shift signal) when the demand signal is produced upon closing of the 1–2 shift switch 60.

The trigger pulse generating circuit 230, which performs in substantially the same manner as the above-mentioned circuit 210, produces one-shot negative polarity signal (shift signal) for a time duration corresponding to the time constant determined by the resistor 232 and the condesnor 233 when the 2–3 shift switch 61 is shifted from on state to off state during the shifting operation from the third gear ratio to the second gear ratio.

The trigger pulse generating circuit 250, which performs in substantially the same manner as that of the above-mentioned circuit 210, would produce a one-shot negative polarity pulse signal (shift signal) having a time duration corresponding to the time constant determined by the resistor 252 and condensor 253 when the 2–3 shift switch 61 is shifted from on state to off state if the delay circuit 240 were not provided, but since the delay circuit 240 is provided as a prestage, the transmission of the change in the output signal to the trigger pulse generating circuit 250 is delayed for a time duration corresponding to the time constant determined by the resistor 241 and the condensor 242, and thus the appearance of a negative polarity pulse signal (shift signal) from the trigger pulse generating circuit 250, as different from the cases of the other trigger pulse generating circuits 210, 220, 230, is retarded with respect to the appearance of the demand for shifting.

In this manner, during the time period when the shift signal provided by the trigger pulse generating circuit 210, 220, 230 or 250 is present, the AND circuit 207 does not produce the lock-up signal even when the lock-up permission signal $S_L$ is fed thereto so that even during operation within lock-up range A or B or C shown in FIG. 7, the solenoid valve 31 is deenergized to release the lock-up clutch during the shifting operation, thus reducing the magnitude of a shift shock.

Since the delay circuit 240 is added, the temporal suspension of the lock-up state during shifting operation concurrs with the actual shifting operation in the automatic transmission, thus effectively preventing the racing of the engine and the occurrence of a great shift shock.

Although, in the example described as above, the delay circuit 240 is provided at a prestage prior to the trigger pulse generating circuit 250 only, a delay circuit may be provided in a prestage of one or each of the other trigger generating circuits 210, 220 and 230 if the delay of the initiation of the shifting operation causes a problem.

Although, in the case of the example described as above, electronic circuits are used, the same function performed by these electronic circuits may be performed by a micro computer or processor. Thus, the use of the micro computer or processor instead of the electronic control circuits is also within the scope intended by the present invention.

What is claimed is:

1. A lock-up type automatic transmission comprising:
   a torque converter having a pump impeller and a turbine runner;
   a lock-up clutch having a clutch piston drivingly connected to said turbine runner and being selectively engageable with said pump impeller;
   control means for engaging and disengaging said lock-up clutch, said control means including a lock-up control valve and a solenoid valve to control the shifting of said lock-up control valve;
   lock-up decision means for producing a lock-up permission signal;
   means for detecting a demand for shifting between two gear ratios in the transmission for producing a demand indicative signal;
   delay means operatively connected with said demand detecting means for retarding the transmission of said demand indicative signal;
   shifting operation detector means connected with said delay means for receiving said demand indicative signal therefrom for producing a shift signal having a predetermined time duration in response to said demand indicative signal; and
   solenoid valve control means for controlling said solenoid valve to effect engagement of said lock-up clutch under conditions when said lock-up permission signal is present and said shift signal is absent, but to effect temporal disengagement of said lock-up clutch during the presence of said shift signal even when said lock-up permission signal is present.

2. A lock-up type automatic transmission as claimed in claim 1, including a shift valve having an axially movable spool and a stationary electrical contact cooperating with said axially movable spool to form shift switch means for changing an output signal thereof from one level to another level upon axial movement of said axially movable spool, and wherein said shifting operation detector means includes a trigger pulse generator connected to said shift switch means through said delay means, whereby the transmission of a change in level of the output signal of said shift switch means to said trigger pulse generator is delayed and said trigger pulse generator produces said shift signal upon receiving said change in level of the output signal of said switch means from said delay means.

3. A lock-up type automatic transmission as claimed in claim 2, including vehicle speed sensor means for producing a vehicle speed signal proportional to the vehicle speed, and wherein said lock-up decision means includes a vehicle speed comparator connected to said vehicle speed sensor means, a gear ratio detector connected to said shift switch means and logic means connected to said vehicle speed comparator and said gear ratio detector for producing said lock-up permission signal when said vehicle speed signal is higher than a predetermined vehicle speed value in each of said forward gear ratios of the transmission.

4. A lock-up type automatic transmission for an automotive vehicle having an engine with an engine output shaft, comprising:
- a transmission mechanism including a torque converter having a pump impeller connected to the engine output shaft and a turbine runner, and a change speed gearing operatively connected to said turbine runner;
- a lock-up clutch which is engageable to establish a power delivery path between the engine and said change speed gearing bypassing said torque converter;
- a hydraulic control system operatively connected with said power transmission mechanism for shifting said change speed gearing between two gear ratios, said hydraulic control system including a source of actuating fluid pressure and a shift valve operatively connected between said source of actuating fluid pressure and said transmission mechanism to control the supply of said actuating fluid pressure to and discharge thereof from said transmission mechanism, said shift valve having a spool movable between a first position and a second position for supplying said actuating fluid pressure to said transmission mechanism and discharging said actuating fluid pressure from said transmission mechanism respectively;
- a shift switch operatively connected to said shift valve and cooperating with said spool to be actuated thereby and generating an output signal which changes to first and second levels corresponding to said first and second positions of said spool, respectively;
- means responsive to the change in said output signal of said shift switch for generating a shift signal having a predetermined time duration;
- vehicle speed sensor means for detecting a vehicle speed of the automotive vehicle and generating a vehicle speed indicative signal;
- lock-up decision means responsive to said vehicle speed indicative signal for producing a lock-up permission signal;
- means responsive to said lock-up permission signal and said shift signal for engaging said lock-up clutch when said permission signal is present and said shift signal is absent and for temporarily disengaging said lock-up clutch when both said lock-up permission and shift signals are present for said predetermined time duration; and
- a delay circuit operatively disposed between said shift switch and said lock-up clutch engaging means for retarding the transmission of said change in said output signal of said shift switch so as to retard the appearance of said shift signal from the occurrence of said change in the output signal of said shift switch.

* * * * *